3,046,139
PROCESS FOR PREPARING A PRE-COOKED CORN FLOUR
Max R. Gould and Leo P. Carroll, Barrington, and Ralph Cervantes, Algonquin, Ill., assignors to The Quaker Oats Company, Chicago, Ill., a corporation of New Jersey
No Drawing. Filed Apr. 9, 1959, Ser. No. 805,126
4 Claims. (Cl. 99—93)

This invention relates to cereal flours and more particularly to a cereal flour prepared from dehulled, degerminated corn.

Corn flours have been prepared which have valuable economic uses. However, heretofore no corn flour has been produced which is suitable for making arepas and which has a satisfactory shelf life, e.g. does not become spoiled or stale during the interim between manufacture and actual use by the consumer.

Arepas are unleavened griddle-cakes, pancakes or biscuits made from cooked and ground corn, which are popular in many South American countries. Heretofore, to prepare arepas the consumer has had to cook the corn in water, drain off the excess water, grind the wet cooked corn in a hand grinder, and then almost immediately thereafter, to avoid spoilage, form the doughy mass into cakes and bake them in an oven or on a grill.

An object of this invention is to produce a pre-cooked storage-stable white flour from dehulled and degerminated corn.

Another object of this invention is to produce a pre-cooked, dry, white, corn flour which when admixed with from about 2 parts to about 3 parts by weight of water produces a dough which is readily handled and formed and which when further subjected to baking temperatures produces a crusted biscuit in which the under-crust portion is comparable to the original dough.

A further object is to produce a pre-cooked, milled and dried, white corn flour having a minimum amount of water and which subsequent to the pre-cooking and prior to the drying comprises substantially entirely swollen whole starch granules, the starch granules being swollen to such an extent that their bulk volume is from about 2 to about 3 times their bulk volume prior to cooking.

In accordance with the invention these objects are accomplished by a procedure which involves essentially the following steps:

(1) Steeping substantially dehulled and substantially degerminated corn in water at a temperature in the range from about 170° F. to 212° F. for a time period in the range from about 3 hours to about ½ hour;

(2) Removing the free water and drying the resulting cooked grits to a moisture content of not less than 30% by weight;

(3) Comminuting and further drying the partially-dried steeped grits to a moisture content of no more than 15% by weight and a particle size of less than about 20 mesh.

Throughout this description, where mesh sizes are given, the U.S. Sieve Series is intended, and where moisture contents are given they are on a wet basis.

It is important that the flour product have a moisture content of no more than 15% by weight to avoid spoilage problems on storage of the flour product for extended periods of time prior to use by the consumer.

It is preferable that the steeping in step 1 above be carried out so as to produce cooked grits having a moisture content in excess of 50% by weight after draining off the free water. Any degerminated dehulled corn is suitable as a starting material, the time of steeping being to some extent dependent on the size of the corn particles. For example, when using water near boiling temperature the preferred time period is about 90 minutes for degerminated dehulled kernels comprising 70% to 80% of the whole kernel and is about 45 minutes for kernel particles such as pearled hominy commonly known as 4/5 grits (pass through 4 mesh screen but retained on 5 mesh screen). Cooking time is a function of the particle size and the time may be further reduced to as little as ½ hour by use of smaller particles. As cooking proceeds, additional water may be added to maintain sufficient excess water in the mixture. After cooking the desired length of time the excess water is drained off and the corn is preferably rinsed or cooled to render it easier to handle. It is not essential, however, to cool the corn.

In step 3 above the partially-dried corn is processed in such a manner as to increase its surface area. For example, it may be ground or shredded to a particle size of less than about 8 mesh; dried to a moisture content not more than 15% by weight; and then ground or shredded to a particle size of less than about 20 mesh. Alternatively, the partially-dried steeped grits resulting from step 2 may be flaked by passing between conventional flaking rolls; dried to a moisture content of no more than 15% by weight; and then comminuted, e.g. by grinding or shredding to a particle size of less than about 20 mesh.

In a more specific embodiment of the invention, degerminated dehulled corn is immersed in about 3 to about 6 parts of boiling water by weight and heating is continued to maintain the temperature at least at about 170° F. but preferably near the boiling point of water for a time period in the range from about 3 hours to about ½ hour. Where a lower temperature in the range is employed a longer holding time is required than where a higher temperature is employed. The cooking may be carried out in a jacketed cooker through which a heating medium may be circulated or live steam may be injected directly into the mixture. As cooking proceeds water will be absorbed by the corn and some may be lost by evaporation. Additional water may be added to maintain an excess of water. Where near boiling temperatures are employed the cooking is continued for one hour and preferably 1½ hours in the case of degerminated dehulled corn or for 30–45 minutes for 4/5 grits. At the end of such cooking time the corn has a moisture content of about 50% to about 60% by weight.

After cooking the corn, the excess water is allowed to drain off. The corn is then preferably rinsed with cold water or cooled by air to make it easier to handle in the subsequent partial-drying step. The preferred method of partial-drying is to place the corn on a large table which has a perforated screen as a top and through the perforations of which heated air is blown. Room air may be heated by blowing it across steam coils in such a way as to raise its temperature to 200–250° F. after which it is blown up through the corn. A hood above the table connected to a vent fan conducts the moisture away and facilitates drying. In a more preferred method the corn is treated in this manner with heated air at about 240° F. for about 30 minutes and the moisture reduced to less than 40%. The corn is then cooled on the same table by using room temperature air for about 5 minutes. Other methods of drying may be employed such as the use of continuous rotary or belt dryers.

Subsequent to the partial-drying the corn is preferably ground in a grinder or comminuting machine which will handle materials of this nature, for example a Cog mill manufactured by the Cog Corporation or a Fitz mill manufactured by the W. J. Fitzpatrick Company, both of Chicago, Illinois. In a preferred method the material is ground through a screen with about a ⅛ inch diameter round hole. In any case the grinding method employed should be one which avoids compaction and makes the maximum use of cutting or abrasion to produce fine particles.

Subsequent to the initial grinding in the above specific embodiment, the ground material is returned to the dryer. Using an air temperature of about 240° F. the corn is dried in about 20 to about 30 minutes to a moisture content of about 10% by weight. The dried material is then ground again if necessary to reduce it to a range of granulation of less than 20 mesh.

The invention is further illustrated but is not limited by the following examples:

Example 1

About 35 pounds of white pearled hominy commonly known as 4/5 grits were cooked in excess boiling water in a jacketed open kettle using 3 p.s.i.g. (pounds per square inch gauge) steam pressure on the jacket for 35 minutes. The water was drained off and the grits rinsed with cold water. The moisture content of the grits after rinsing was 59% by weight. The grits were then placed on a pan or table dryer as previously described and room temperature air was blown through them for 45 minutes. The partially dried grits were then flaked through a pair of smooth rolls to a flake of about 1/16 inch thickness. The moisture content of the corn after flaking was 45% by weight. The flakes were again placed on the pan dryer and dried with heated air at 235° F. for 25 minutes. The dried flakes were then ground in a hammermill through a 0.039 inch diameter round hole screen. The moisture content of the resulting white flour was 5.2% by weight.

Example 2

About 40 pounds of 4/5 grits were added to 240 pounds of boiling water in a jacketed kettle. The steam pressure on thie jacket was maintained at 2.5 p.s.i.g. Cooking was carried out for 40 minutes, the water drained, the grits rinsed with cold water and then placed on a pan dryer. Prior to drying the cooked grits had a moisture content of 59.6% by weight. The drying was done with room temperature air for 35 minutes, reducing the moisture content of the grits to 52.4% by weight. The partially dried grits were then flaked as in Example 1. The flakes were then returned to the dryer and heated air at 235° F. was used to dry them for 25 minutes. The thickness of the dried flakes varied from 0.098 inch to 0.046 inch. The dried flakes were then ground in a hammermill through a 0.039 inch diameter round hole screen to produce a white flour containing 5.4% moisture by weight.

Example 3

Three parts by weight of 4/5 grits were cooked in 18 parts by weight of water in an open jacketed kettle using 3 to 5 p.s.i.g. steam pressure on the jacket for one hour. The cooked grits were dried for 40 minutes with room temperature air to a moisture content of 46% by weight. The partially-dried grits were ground in a comminuting machine (Fitz mill) using a screen with a round hole opening of 7/32 inch diameter. The ground material was returned to the pan dryer and dried for 8 minutes using air flowing over a steam radiator with a steam pressure of 75 p.s.i.g. The dried material was then ground in a hammermill using a 0.039 inch diameter round hole screen. The moisture content of the resulting white flour was 11.5% by weight.

Example 4

About 85 pounds of dehulled degerminated corn from Colombia, South America, was cooked in an open jacketed kettle using 250 pounds of boiling water and a jacket pressure of 3 to 5 p.s.i.g. of steam for 1½ hours. The moisture content of the corn after cooking was 57.8% by weight. After rinsing with cold water the corn was placed on a pan dryer and dried for 40 minutes using room temperature air. The corn was then ground in a comminuting machine (Fitz mill) using a 3/8 inch diameter round hole screen. After comminuting, the corn was returned to the pan dryer and dried for 45 minutes with air at 235–240° F. The dried material was then reground in a hammermill using a 0.039 inch diameter perforated screen to produce a dry white flour.

Example 5

Water was brought to a boil by injecting live steam into it in a non-jacketed open vessel. Colombian degerminated dehulled corn was then added and boiling maintained by injecting steam into the mixture. After one hour a portion of the corn at 52.9% moisture content by weight was removed and placed on a pan dryer using 235° F. air for 30 minutes followed by room air for 5 minutes. After cooling the corn was ground through a comminuting machine (Fitz mill) using a 5/32 inch diameter round hole screen. The moisture content of the ground material was found to be 19%, so the material was returned to the pan dryer for 30 minutes using 235° F. air and for 5 minutes using room temperature air. The dried material was then ground in a hammermill through a 0.031 inch diameter round hole screen to produce a dry white flour.

Example 6

A portion of the cooked corn in Example 5 was allowed to continue cooking for ½ hour to give a total cooking time of 1½ hours at which time the moisture content of the corn was 59.4% by weight. After draining, the corn was partially dried on a pan dryer for 30 minutes using 235° F. air and for 5 minutes using room temperature air. The partially dried corn was then ground through a comminuting machine (Fitz mill) using a 5/32 inch screen. The moisture content was found to be 36.8% by weight. The ground material was returned to the dryer and dried for 30 minutes using 235° F. air and then for 10 minutes using room temperature air. It was then reground in a hammermill using a 0.031 inch diameter round hole screen to produce a dry white flour.

The white flours produced in Examples 1–6 above were attractive dry products characterized by the absence of flinty, dextrinized particles and having excellent keeping qualities and other desirable properties which the original material did not possess. All of the flours were stable during storage for 10 months at room temperature and during storage for 9 months at 100° F. After these storage periods the flours were stale but were not rancid.

One part by weight of each of the flours produced in Examples 1–6 were mixed with 2 parts by weight of water and in less than one minute a dough was produced which was then formed into cakes. The doughs produced had sufficient cohesion to allow ready forming and sufficiently low adhesive properties so that they were not sticky and could be readily handled. The dough cakes were baked in an oven to produce a crusted biscuit or arepas having a soft under-crust portion. The latter under-crust portion was very similar in properties to the dough cakes prior to baking. The biscuit had a desirable smooth crust which did not burst on baking and along with its dry-to-the-touch crumbly interior had all of the desirable properties of arepas made directly from wet cooked corn in the manner practiced in certain South American countries.

The product produced according to this invention provides a white corn flour which can be used to make arepas with all the desired properties at a great saving to the user in time and effort. It eliminates the need for cooking of the corn by the user and provides a stable flour from which arepas in any desired quantity can be made quickly. The flour produced has the ability to absorb at least 2 parts water by weight to form a dough in less than one minute which can be readily handled and easily formed into cakes for baking. The water which is absorbed is held in a way that on baking the formed cakes, a biscuit is produced having a smooth crust with small uniform cracks and an interior which feels dry and crumbly and is not sticky to the touch. Other methods of preparing corn flours lead to doughs which may have the ability to absorb sufficient water but produce doughs which are too cohesive or tend to be rubbery or tight and/or may be sticky with consequent difficulty in handling and forming.

We claim:

1. A process for producing a precooked, storage-stable, white, arepa corn flour from substantially dehulled and substantially degerminated corn comprising steeping said corn in water at a temperature in the range from about 170° F. to 212° F. for a time period in the range from about 3 hours to about ½ hour; removing free water and drying the resulting cooked grits to a moisture content of not less than 30% by weight; and comminuting and further drying the partially-dried steeped grits to a moisture content of no more than 15% by weight and a particle size of less than about 20 mesh.

2. A process according to claim 1 in which said steeping produces cooked grits having a moisture content in excess of 50% by weight after removing free water.

3. A process for producing a precooked, storage-stable, white, arepa corn flour from substantially dehulled and substantially degerminated corn comprising steeping said corn in water at a temperature in the range from about 170° F. to 212° F. for a time period in the range from about 3 hours to about ½ hour; removing free water and drying the resulting cooked grits to a moisture content of not less than 30% by weight; flaking the partially-dried steeped grits so as to increase their surface area; drying the flaked grits to a moisture content of no more than 15% by weight; and comminuting the resulting dried grits to a particle size of less than about 20 mesh.

4. A process for producing a precooked, storage-stable, white, arepa corn flour from substantially dehulled and substantially degerminated corn comprising steeping said corn in water at a temperature in the range from about 170° F. to 212° F. for a time period in the range from about 3 hours to about ½ hour; removing free water and drying the resulting cooked grits to a moisture content of not less than 30% by weight; comminuting the partially-dried steeped grits to a particle size of less than about 8 mesh; drying the resulting ground grits to a moisture content of no more than 15% by weight; and comminuting the resulting dried ground grits to a particle size of less than about 20 mesh.

References Cited in the file of this patent

UNITED STATES PATENTS

| 427,159 | Currie | May 6, 1890 |
| 437,964 | Bates | Oct. 7, 1890 |
| 440,866 | Lauhoff | Nov. 18, 1890 |
| 491,428 | Hudnut | Feb. 7, 1893 |
| 826,983 | Wreford | July 24, 1906 |
| 1,499,080 | Short et al. | June 24, 1924 |

FOREIGN PATENTS

| 10,788 | Great Britain | of 1892 |